(12) United States Patent
Yasuzaka

(10) Patent No.: US 8,707,765 B2
(45) Date of Patent: Apr. 29, 2014

(54) FUEL VAPOR LEAK DETECTION DEVICE

(75) Inventor: Taiki Yasuzaka, Nagoya (JP)

(73) Assignee: Denso Corporation, Kariya (JP)

( * ) Notice: Subject to any disclaimer, the term of this patent is extended or adjusted under 35 U.S.C. 154(b) by 267 days.

(21) Appl. No.: 13/427,003

(22) Filed: Mar. 22, 2012

(65) Prior Publication Data

US 2012/0240664 A1 Sep. 27, 2012

(30) Foreign Application Priority Data

Mar. 22, 2011 (JP) .................................. 2011-62878

(51) Int. Cl.
*G01M 3/04* (2006.01)

(52) U.S. Cl.
USPC .......................................................... 73/40.7

(58) Field of Classification Search
USPC ................................................. 73/40.7, 49.2
See application file for complete search history.

(56) References Cited

U.S. PATENT DOCUMENTS

| 7,004,013 B2 * | 2/2006 | Kobayashi et al. ............ 73/49.7 |
| 2003/0213478 A1 | 11/2003 | Fritz et al. |
| 2003/0226549 A1 | 12/2003 | Takagi et al. |
| 2006/0090553 A1 | 5/2006 | Nagasaki et al. |
| 2008/0092858 A1 | 4/2008 | Satoh et al. |

FOREIGN PATENT DOCUMENTS

| JP | 2003-269266 | 9/2003 |
| JP | 2004-011561 | 1/2004 |
| JP | 2006-132324 | 5/2006 |
| JP | 2008-025469 | 2/2008 |
| JP | 2008-101524 | 5/2008 |

* cited by examiner

*Primary Examiner* — Peter Macchiarolo
*Assistant Examiner* — Tamiko Bellamy
(74) *Attorney, Agent, or Firm* — Nixon & Vanderhye PC

(57) ABSTRACT

A fuel vapor leak detection device for detecting a leakage of fuel vapor includes a pump which pressurizes or depressurizes insides of a fuel tank and a canister, a motor which drives the pump, an electrical current detector which detects a current value applied to the motor, a switching valve, and a controller. The switching valve includes an air passage having a narrowing part therein and communicating with atmosphere, a first passage connecting to the pump, a canister connection passage connecting to the canister, and a second passage connecting to the pump. The controller controls a switching operation of the switching valve based on the current value detected by the electrical current detector to select one of a communication between the air passage and the first passage, and a communication between the canister connection passage and the second passage.

4 Claims, 13 Drawing Sheets

FUEL VAPOR LEAK DETECTION DEVICE

CROSS REFERENCE TO RELATED APPLICATION

This application is based on and incorporates herein by reference Japanese Patent Application No. 2011-062878 filed on Mar. 22, 2011.

TECHNICAL FIELD

The present disclosure relates to a fuel vapor leak detection device.

BACKGROUND

Conventionally, a fuel vapor leak detection device, which detects a leakage of fuel vapor generated in a fuel tank, is known. The fuel vapor leak detection device detects a leakage of fuel vapor from the fuel tank by changing a pressure in the fuel tank by a pump, which can pressurize and depressurize. The fuel vapor leak detection device is connected to a canister which recovers fuel vapor in the fuel tank. Fuel vapor recovered by the canister is transferred to an intake passage by utilizing air introduced from the atmosphere. The fuel tank connected to the canister communicates with the atmosphere through the canister. Patent Document 1 (JP-A-2004-011561 corresponding to US 2003/0226549 A1) describes regarding a fuel vapor leak detection device of a fuel vapor treatment system, in which a fuel tank is isolated from the atmosphere in a normal state by providing an open/close valve, which opens and closes the fuel tank, in a passage between the fuel tank and a canister.

However, the fuel vapor treatment system described in Patent Document 1 further includes a switching valve besides the open/close valve. The switching valve switches from a connection between the canister and the atmosphere to a disconnection therebetween when detecting a leakage of fuel vapor. Therefore, a volume of the fuel vapor treatment system described in Patent Document 1 is large because the fuel vapor treatment system includes both of the open/close valve and the switching valve.

SUMMARY

The present disclosure addresses at least one of the above disadvantages.

According to an aspect of the present disclosure, a fuel vapor leak detection device is for detecting a leakage of fuel vapor in a fuel vapor treatment system having a canister which adsorbs fuel vapor generated in a fuel tank. The fuel vapor leak detection device includes a pump, a motor, an electrical current detector, a switching valve and a controller. The pump pressurizes or depressurizes insides of the fuel tank and the canister, and the motor which drives the pump. The electrical current detector detects a current value applied to the motor. The switching valve includes an air passage having a narrowing part therein and communicating with atmosphere, a first passage connecting to the pump, a canister connection passage connecting to the canister, and a second passage connecting to the pump. The controller controls a switching operation of the switching valve based on the current value detected by the electrical current detector to select one of a communication between the air passage and the first passage, and a communication between the canister connection passage and the second passage.

According to another aspect of the present disclosure, a fuel vapor leak detection device is for detecting a leakage of fuel vapor in a fuel vapor treatment system having a canister which adsorbs fuel vapor generated in a fuel tank. The fuel vapor leak detection device includes a pump, a switching valve, a pressure detector and a controller. The pump pressurizes or depressurizes insides of the fuel tank and the canister. The switching valve includes an air passage having a narrowing part therein and communicating with atmosphere, a first passage connecting to the pump, a canister connection passage connecting to the canister, and a second passage connecting to the pump. The pressure detector detects pressures in the first passage and in the second passage. The controller controls a switching operation of the switching valve based on the pressures detected by the pressure detector to select one of a communication between the air passage and the first passage, and a communication between the canister connection passage and the second passage.

BRIEF DESCRIPTION OF THE DRAWINGS

The disclosure, together with additional objectives, features and advantages thereof, will be best understood from the following description, the appended claims and the accompanying drawings in which:

DETAILED DESCRIPTION

Figure 1:
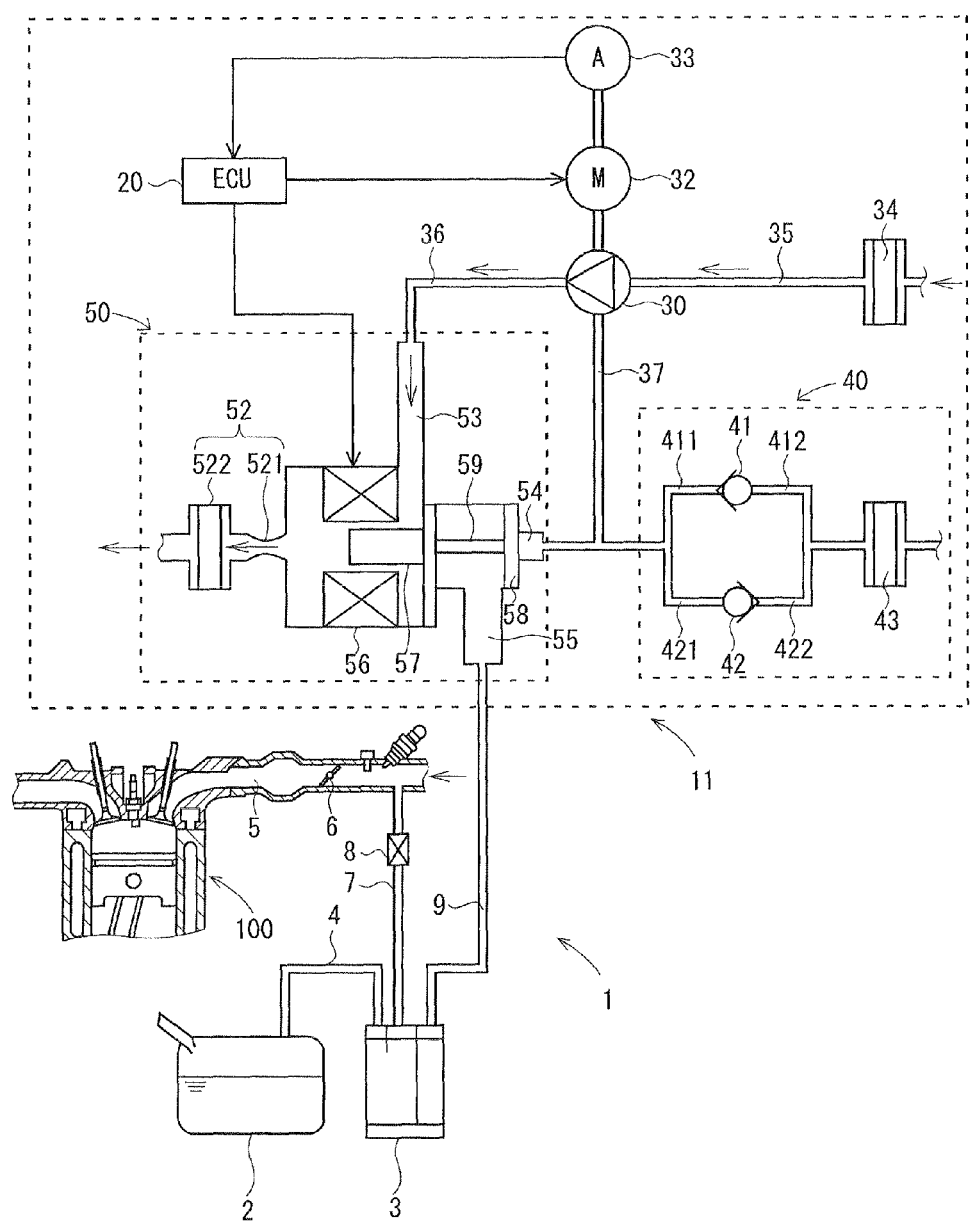
FIG. 1 is a schematic diagram showing a fuel vapor treatment system provided with a fuel vapor leak detection device according to a first embodiment of the present disclosure.

Fuel vapor leak detection devices according to embodiments of the disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, a fuel vapor treatment system 1 includes a fuel tank 2, a canister 3, and a fuel vapor leak detection device 11. The fuel tank 2, which contains fuel to be supplied to an engine 100, and the canister 3 are connected to each other through a first purge pipe 4. The canister 3 is connected to an intake passage 5 at a position adjacent to a throttle valve 6 through a second purge pipe 7. In the second purge pipe 7, a purge valve 8 is provided. Fuel vapor generated in the fuel tank 2 passes through the first purge pipe 4 and is adsorbed into an adsorption agent made of an activated carbon in the canister 3. The purge valve 8 is an electromagnetic valve, and a fuel vapor amount purged from the canister 3 into the intake passage 5 is regulated by controlling an open degree of the purge valve 8.

The fuel vapor leak detection device 11 is connected to the canister 3, and includes a switching valve 50, a pressurizing pump 30, and a check valve part 40. The pressurizing pump 30 may be used as a pump which pressurizes or depressurizes insides of the fuel tank 2 and the canister 3.

The switching valve 50 is a four-way valve, including an air passage 52, a first passage 53, a second passage 54, and a canister connection passage 55. The air passage 52 communicates with the atmosphere, and the canister connection passage 55 is connected to the canister 3 through a canister passage 9. The switching valve 50 switches between a communication between the air passage 52 and the first passage 53 and a communication between the canister connection passage 55 and the second passage 54 by a command from an electronic control unit (ECU) 20 as an example of a controller. A structure of the switching valve 50 will be described later.

The pressurizing pump 30 is an electrical type pump electrically actuated by a motor 32. A first pump passage 36 and a second pump passage 37 are connected to the pressurizing pump 30. The first pump passage 36 is connected to the first passage 53 of the switching valve 50, and the second pump passage 37 is connected to the second passage 54 of the switching valve 50. The pressurizing pump 30 is further connected to a pump filter 34 via a filter passage 35. The pump filter 34 removes foreign material contained in air introduced by the pressurizing pump 30. An ammeter 33 as an example of an electrical current detector is provided for the motor 32, which actuates the pressurizing pump 30, and detects a current value in the motor 32.

The check valve part 40 includes a first check valve 41, a second check valve 42, and a check valve filter 43. A first upstream passage 411 provided on an upstream side of the first check valve 41 and a second downstream passage 421 provided on a downstream side of the second check valve 42 are connected to the second pump passage 37. A first downstream passage 412 provided on a downstream side of the first check valve 41 and a second upstream passage 422 provided on an upstream side of the second check valve 42 are connected to one side of the check valve filter 43. The other side of the check valve filter 43 communicates with the atmosphere. The check valve filter 43 removes foreign material contained in air introduced from the atmosphere to the fuel vapor leak detection device 11.

The first check valve 41 opens when a pressure P in the second pump passage 37 is larger than a predetermined first pressure P1. By opening the first check valve 41, air in the fuel tank 2 is emitted into the atmosphere through the second pump passage 37, the first check valve 41, and the check valve filter 43. In this case, the switching valve 50 is switched such that the canister connection passage 55 and the second passage 54 communicate with each other. Thus, fuel filling to the fuel tank 2 becomes easy.

The second check valve 42 opens when a pressure derived by subtracting the pressure P in the second pump passage 37 from an atmosphere pressure Pa is larger than a predetermined second pressure P2. By opening the second check valve 42, air flows from the atmosphere into the second pump passage 37 through the check valve filter 43 and the second check valve 42. In this case, the switching valve 50 is switched such that the canister connection passage 55 and the second passage 54 communicate with each other. Accordingly, air flows into the fuel vapor leak detection device 11 from the atmosphere, thereby purging fuel vapor adsorbed in the adsorption agent of the canister 3 to the intake passage 5.

Figure 3:
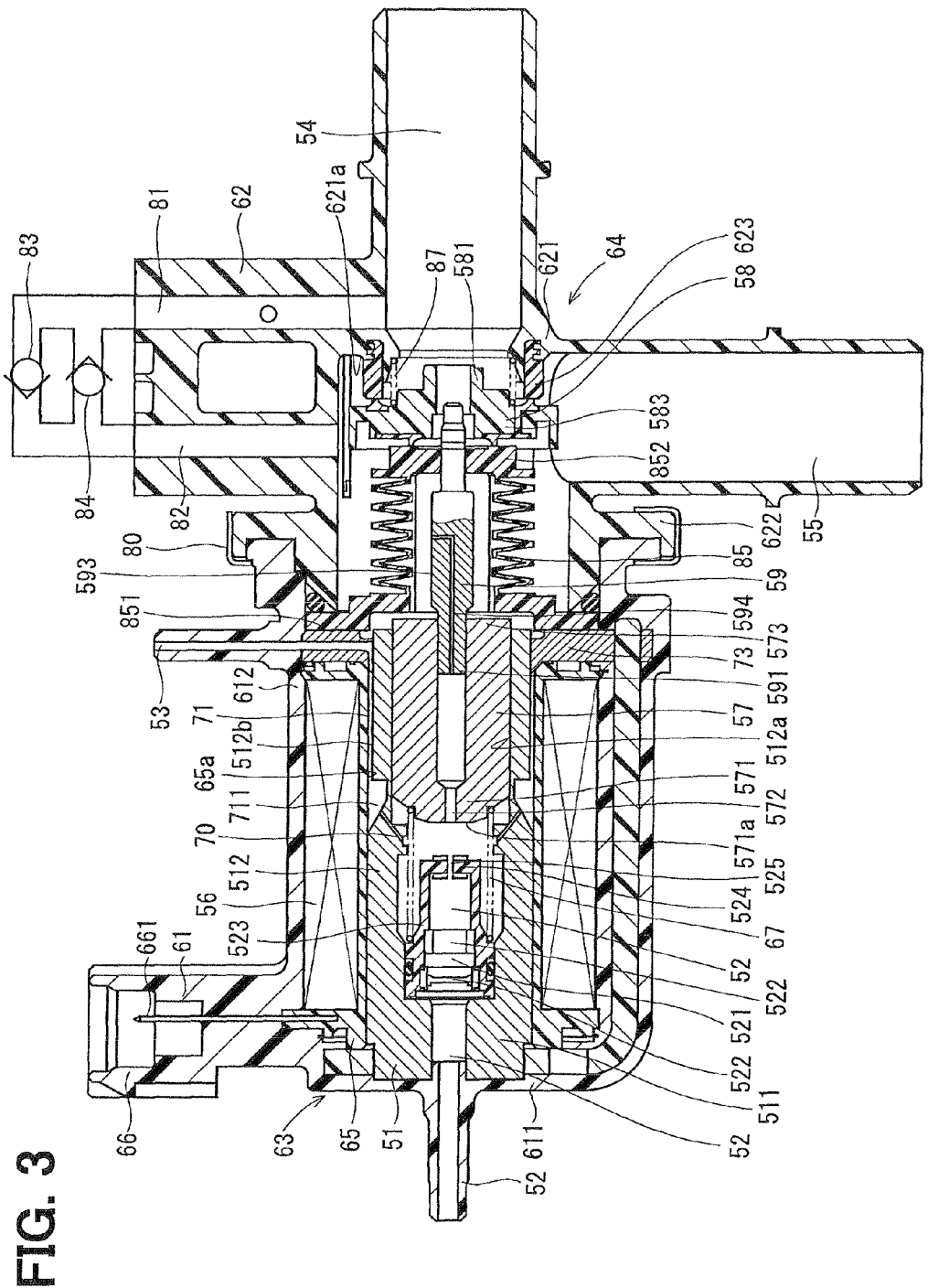
FIG. 3 is a sectional view showing a switching valve utilized in the fuel vapor leak detection device according to the first embodiment.

As shown in FIG. 3, the switching valve 50 includes a first housing 61, a second housing 62, a first valve part 63, and a second valve part 64.

The first housing 61 has a nearly cylindrical shape and includes a bottom part 611 and a cylindrical part 612. The bottom part 611 defines the air passage 52 through which an inner side of the bottom part 611 communicates with an outer side of the bottom part 611. The first passage 53 and a connector 66 are provided on a radially outer side of the cylindrical part 612. A terminal 661 made of metal is disposed inside the connector 66. The connector 66 is electrically connected to the ECU 20, and electrical power is supplied from the outside to a coil 56 through the terminal 661. The first housing 61 may be used as a part of an air passage forming member which defines the air passage 52.

The first valve part 63 is accommodated in the first housing 61, and includes the coil 56, a mold 65, a fixed core 51, a movable core 57, an orifice housing 523, and a first spring 67.

The coil 56 having a nearly cylindrical shape is supported by the nearly cylindrical mold 65 disposed coaxially with the coil 56, and is located on a radially inner side of the first housing 61. The coil 56 receives electrical power supplied through the terminal 661 of the connector 66, thereby producing magnetic force. The mold 65 may be used as a coil support which supports the coil 56.

The fixed core 51 is disposed to contact an inner wall surface of the bottom part 611 of the first housing 61 and to contact a radially-inner wall surface 65a of the mold 65. The fixed core 51 has a nearly cylindrical and bottomed shape and is made of magnetic material such as ferritic stainless, for example. The fixed core 51 includes a cylindrical part 512 and a bottom part 511. The cylindrical part 512 of the fixed core 51 defines a first communication passage 70 through which an inner wall surface 512a of the cylindrical part 512 communicates with an outer wall surface 512b of the cylindrical part 512. In the outer wall surface 512b, a recess 711 communicating with the first communication passage 70 is provided. The movable core 57 is inserted into the fixed core 51 from one end side opposite from the bottom part 511. An outer diameter of the fixed core 51 at the one end side from the recess 711 is smaller than an outer diameter of the fixed core 51 at the other end side from the recess 711. Accordingly, a second communication passage 71 is provided between the outer wall surface 512b at the one end side from the recess 711 and the wall surface 65a of the mold 65. The second communication passage 71 communicates with the first passage 53.

The bottom part 511 of the fixed core 51 defines the air passage 52. The bottom part 511 may be used as a part of the air passage forming member. The orifice housing 523 is disposed to contact an inner wall surface of the bottom part 511 of the fixed core 51. The orifice housing 523 has a nearly cylindrical and bottomed shape and includes an orifice 521 as an example of a narrowing part. Orifice filters 522 are located on both sides of the orifice 521 in an air flow direction. The orifice 521 has an open area which is set to correspond to an upper limit value of a permissible air leak amount including fuel vapor from the fuel tank 2. The orifice filter 522 is made of nonwoven fabric, for example, and removes foreign material from air passing therethrough. The orifice housing 523 may be used as a part of the air passage forming member and an example of a first valve body provided in the air passage forming member.

A bottom part 524 of the orifice housing 523 includes an opening 525 through which an inside of the orifice housing 523 communicates with an inside of the fixed core 51. Accordingly, the inside of the fixed core 51 communicates with the atmosphere through the opening 525, the air passage 52 of the orifice housing 523, the air passage 52 of the bottom part 511 of the fixed core 51, and the air passage 52 of the bottom part 611 of the first housing 61. The bottom part 524 may be used as a first valve seat.

The movable core 57 is made of magnetic material such as ferritic stainless, for example, and has a nearly cylindrical and bottomed shape. The movable core 57 is inserted in and supported by the fixed core 51 slidably with the inner wall surface 512a. An inner surface of the movable core 57 has a cylindrical shape in an axial direction thereof, and a bottom part 571 of the movable core 57 defines a penetration hole 572. The movable core 57 may be used as a first valve member.

One end of the first spring 67 is engaged with the movable core 57, and the other end of the first spring 67 contacts the orifice housing 523. The first spring 67 is configured to stretch in the axial direction of the movable core 57. Thus, the first spring 67 biases the movable core 57 in a direction away from the orifice housing 523.

The second housing 62 is disposed such that an opening portion thereof is connected to an opening portion of the first housing 61 on a side of the first housing 61 opposite from the air passage 52. The first housing 61 and the second housing 62 are fixed to each other by using a fastening member 80. The second housing 62 has a nearly cylindrical shape, and includes a bottom part 621 and a cylindrical part 622. The bottom part 621 defines the second passage 54 connected to the pressurizing pump 30. The cylindrical part 622 defines the canister connection passage 55 connected to the canister 3, a first release passage 81, and a second release passage 82. A location of the canister connection passage 55 is axially-symmetrical to locations of the first and second release passages 81 and 82 with respect to an axis of the second housing 62.

The second valve part 64 is accommodated in the second housing 62 and includes a valve member 58, a second spring 87, a bellows 88, and a valve shaft 59. The second housing 62 may be used as a second passage forming member which defines the second passage 54.

The valve member 58 has a shape such that hollow cylinders having various diameters are accumulated coaxially. The valve member 58 includes a small diameter part 581, which has the smallest diameter and is arranged at an end of the valve member 58 near the second passage 54. The valve member 58 further includes a large diameter part 583, which has the largest diameter and is arranged at an end of the valve member 58 opposite from the second passage 54. One edge of the second spring 87 is engaged with a side of the large diameter part 583 near the second passage 54, and the other edge of the second spring 87 contacts the bottom part 621 of the second housing 62. When the coil 56 is not energized, a side of the valve member 58 near the second passage 54 contacts a contact member 623 disposed in an inner surface 621a of the bottom part 621. The second spring 87 is configured to stretch in the axial direction of the valve member 58, thereby biasing the valve member 58 in a direction away from the contact member 623. An end surface of the large diameter part 583 opposite from the second passage 54 contacts a one side end part 852 of the bellows 85 near the second passage 54. The contact member 623 may be used as a part of the second passage forming member, an example of a second valve body, and an example of a second valve seat. The valve member 58 may be used as a second valve member.

The bellows 85 is made of resin, for example, and the other side end part 851 of the bellows 85 opposite from the second passage 54 is engaged with a flange 73 that is in contact with the outer wall surface 512b of the fixed core 51. An inside of the bellows 85 is isolated from an inside of the second housing 62.

One side end of the valve shaft 59 is connected to the one side end part 852 of the bellows 85 near the second passage 54, and the other side end of the valve shaft 59 is connected to an end part 573 of the movable core 57 near the second passage 54. Hence, the one side end part 852 of the bellows 85 is integrated with the movable core 57, thereby reciprocating in an axial direction of the second housing 62 in accordance with a movement of the movable core 57. The valve shaft 59 defines a communication passage 594 through which an end surface 591 of the valve shaft 59 near the air passage 52 communicates with a lateral surface 593 of the valve shaft 59 inside the bellows 85. Accordingly, the inside of the bellows 85 communicates with an inside of the movable core 57 via the communication passage 594. The valve shaft 59 may be used as an example of a connection member through which the end part 573 of the movable core 57 is connected to the valve member 58.

The first release passage 81 provided in the second housing 62 communicates with the second passage 54. The second release passage 82 communicates with the inside of the second housing 62. The first and second release passages 81 and 82 are connected to each other outside the switching valve 50 through third and fourth check valves 83 and 84. An upstream side of the third check valve 83 is connected to the second release passage 82 and a downstream side of the third check valve 83 is connected to the first release passage 81. An upstream side of the fourth check valve 84 is connected to the first release passage 81 and a downstream side of the fourth check valve 84 is connected to the second release passage 82.

An operation of the switching valve 50 will be described below. When electrical power is not supplied to the coil 56, the movable core 57 is separated from the bottom part 524 of the orifice housing 523. Thus, the air passage 52 is connected to the first passage 53 through the inside of the orifice housing 523, the inside of the fixed core 51, the first communication passage 70, and the second communication passage 71. At this time, the inside of the bellows 85 communicates with the inside of the fixed core 51 through the communication passage 594 of the valve shaft 59, the inside of the movable core 57. Therefore, atmosphere pressure is maintained inside the bellows 85.

When electrical power is supplied to the coil 56, magnetic field is produced. Hence, the movable core 57 is attracted to the fixed core 51, thereby moving to left side in FIG. 3. An outer surface 571a of the bottom part 571 of the movable core 57 contacts the bottom part 524 of the orifice housing 523 against biasing force of the first spring 67. Accordingly, the inside of the fixed core 51 is isolated from the atmosphere. The end part 852 of the bellows 85, which is connected to the movable core 57 via the valve shaft 59, moves toward the air passage 52. Hence, the end part 852 is separated from the large diameter part 583, and the large diameter part 583 is also separated from the contact member 623 by biasing force of the second spring 87. Accordingly, the second passage 54 and the canister connection passage 55 communicate with each other. At this time, the inside of the bellows 85 communicates with the atmosphere through the communication passage 594 of the valve shaft 59, the inside of the movable core 57, and the inside of the orifice housing 523. Therefore, atmosphere pressure is maintained inside the bellows 85.

When the second valve part 64 does not open by malfunction of the switching valve 50, and when an inner pressure in the canister connection passage 55 connected to the canister 3 increases, the third check valve 83 opens such that the fuel tank 2 communicates with the second passage 54. When the second valve part 64 does not open, and when the inner pressure in the canister connection passage 55 decreases, the fourth check valve 84 opens so that air flows into the canister 3, and that fuel vapor adsorbed in the adsorption agent of the canister 3 is refluxed into the intake passage 5.

Figure 4A:
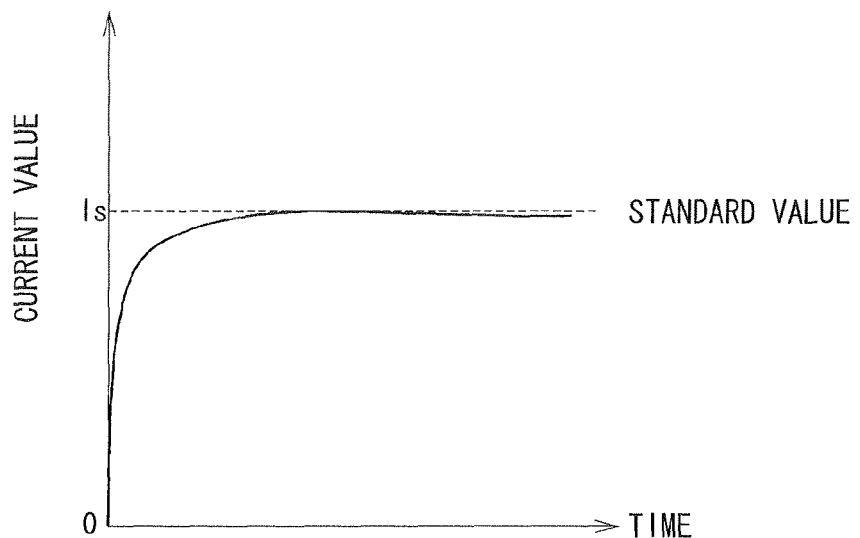
FIG. 4A is a time chart of a current value when measuring a standard value, in the fuel vapor leak detection device according to the first embodiment.

An operation of the fuel vapor leak detection device 11 according to the first embodiment of the present disclosure will be described in reference to FIGS. 1, 2, 4A, and 4B. When a predetermined period of time passes after stopping an operation of the engine installed in the vehicle, the ECU 20 is activated by a soak timer not shown in drawings, and a fuel-vapor leak detection of the fuel tank 2 starts. An atmosphere pressure is detected based on a current value of the motor 32 in order to correct an error due to an altitude of the vehicle in the fuel-vapor leak detection. As shown in FIG. 1, because the coil 56 in the switching valve 50 is not energized, the air passage 52 and the first passage 53 communicate with each other in a first stage. The pressurizing pump 30 driven by the motor 32 discharges pressurized air to the atmosphere via the first passage 53 and the orifice 521 of the air passage 52, as in the arrows in FIG. 1. A value of an electric current flowing to the motor 32 is detected by the ammeter 33. After the elapse of a certain period of time, a current value detected in the ammeter 33 becomes constant as shown in FIG. 4A. The detected current value is referred to as a standard value Is.

Figure 2:
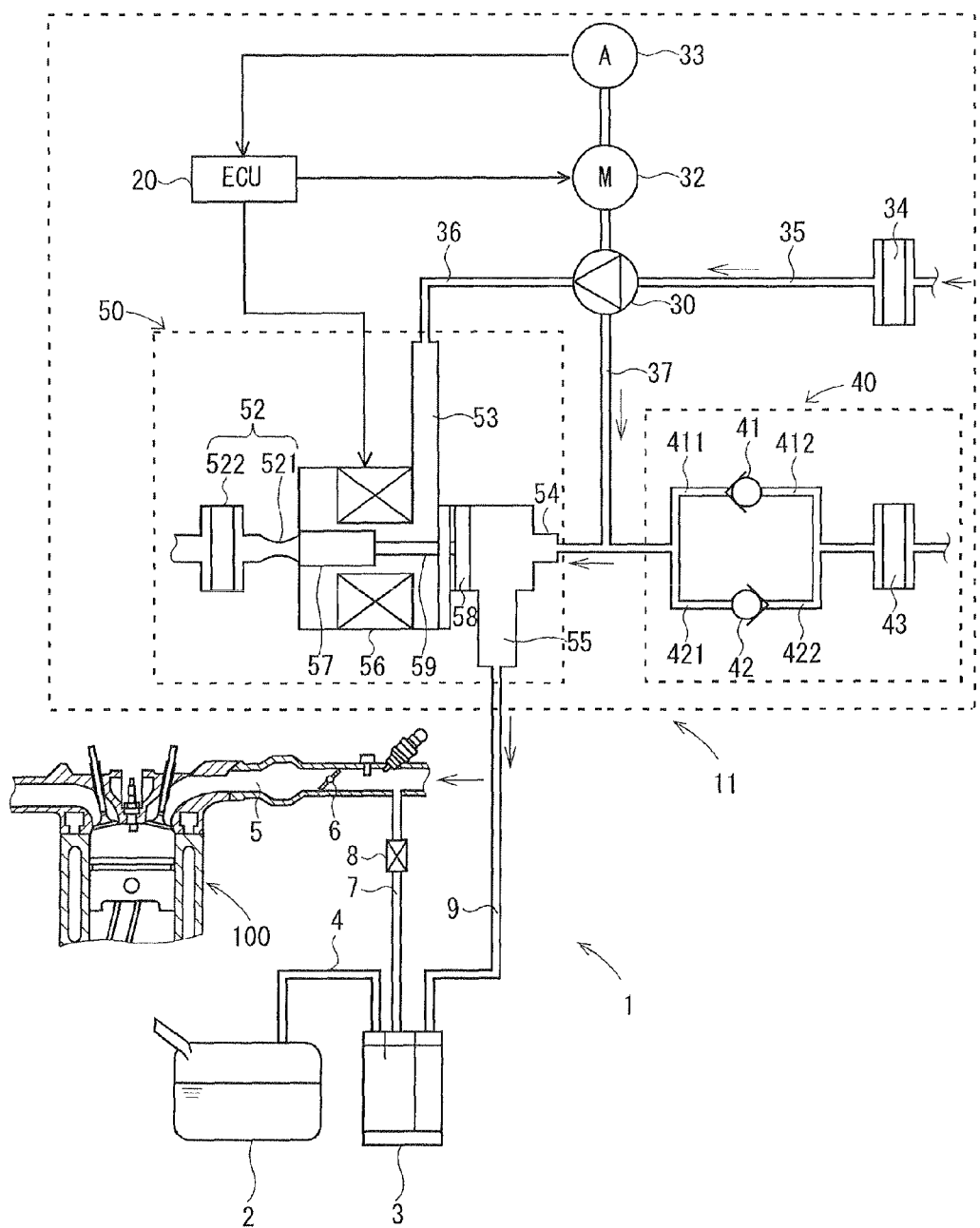
FIG. 2 is a schematic diagram showing the fuel vapor treatment system provided with the fuel vapor leak detection device according to the first embodiment in an operating condition different from FIG. 1.

After the detection of the standard value Is, as shown in FIG. 2, the switching valve 50 is switched to a second stage so that the canister connection passage 55 communicates with the second passage 54. Specifically, the movable core 57 moves to left side in FIG. 2 by energization of the coil 56. The movable core 57 contacts the bottom part 524 of the orifice housing 523, and the air passage 52 is isolated from the first passage 53. The valve member 58 connected to the movable core 57 via the valve shaft 59 also moves to the left side in FIG. 2, so that the second passage 54 communicates with the canister connection passage 55. Accordingly, the pressurizing pump 30 connected to the fuel tank 2 and the canister 3 pressurizes insides of the fuel tank 2 and the canister 3. Air flows in the second stage as shown in the arrows in FIG. 2.

Figure 4B:
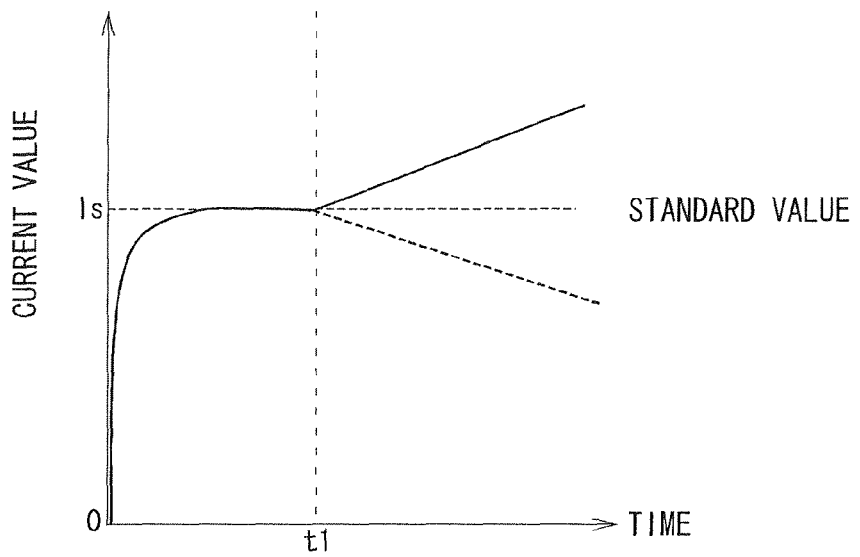
FIG. 4B is a time chart of a current value when detecting a leakage of fuel vapor, in the fuel vapor leak detection device according to the first embodiment.

As shown in FIG. 4B, a current value of the motor 32, which drives the pressurizing pump 30, starts to change from time t1 when the switching valve 50 is switched from a passage communication between the air passage 52 and the first passage 53 to a passage communication between the second passage 54 and the canister connection passage 55. When a current value detected by the ammeter 33 is larger than the standard value Is after time t1 elapses as shown in the solid line of FIG. 4B, it is determined that a leakage amount of air containing fuel vapor from the fuel tank 2 or the canister 3 is less than a permissible amount. On the other hand, when a current value detected by the ammeter 33 is smaller than the standard value Is as shown in the dashed line of FIG. 4B, it is determined that a leakage amount of air containing fuel vapor from the fuel tank 2 or the canister 3 is more than the permissible amount. Thus, it is determined that a wall surface of the fuel tank 2 or the canister 3 has a hole from which air containing fuel vapor leaks to the atmosphere. Accordingly, it is determined that air sealing of the fuel tank 2 is not sufficiently ensured. At this time, a pressure in the second pump passage 37 connected to the fuel tank 2 and the canister 3 is smaller than the predetermined first pressure P1, and it thereby does not cause the first check valve 41 to be opened.

After finishing of the leak detection of air containing fuel vapor, the pressurizing pump 30 is stopped. When it is detected that a pressure in the second pump passage 37 recovers to the atmosphere pressure, process of the fuel-vapor leak detection terminates.

Effects of the fuel vapor leak detection device 11 according to the first embodiment of the present disclosure will be described below.

(A) The fuel vapor leak detection device 11 detects a leakage of fuel vapor by utilizing the switching valve 50 which switches one of the first stage communicating between the atmosphere and the pressurizing pump 30, and the second stage communicating between the canister 3, the fuel tank 2, and the pressurizing pump 30. When a fuel-vapor leak detection is not carried out, or when an atmosphere pressure as a standard value is detected, the fuel tank 2 and the canister 3 are isolated from the atmosphere by the switching valve 50. When a fuel-vapor leak detection of the fuel tank 2 and the canister 3 is carried out, the fuel tank 2 or the canister 3 is connected to the pressurizing pump 30 by switching operation of the switching valve 50 so that a leakage of fuel vapor can be detected. Hence, by utilizing the single valve, the fuel tank 2 and the canister 3 can be sealed from the atmosphere, and a leakage of fuel vapor also can be detected. Therefore, a size of the fuel vapor leak detection device 11 can be reduced.

(B) Moreover, because the fuel tank 2 and the canister 3 can be closed and a leakage of fuel vapor also can be detected by utilizing the single valve, the number of components of the fuel vapor leak detection device 11 can be reduced.

(C) The fuel vapor leak detection device 11 includes two check valves connected to the second pump passage 37. The first check valve 41 of the two check valves opens when a pressure in the second pump passage 37 is larger than the predetermined first pressure P1. Accordingly, when fuel is filled to the vehicle, air in the fuel tank 2 can be removed promptly by using the check valve 41. Therefore, required time for filling fuel to the vehicle can be reduced.

(D) The fuel vapor leak detection device 11 includes two check valves connected to the second pump passage 37. The second check valve 42 of the two check valves opens when a pressure derived by subtracting the pressure P in a second pump passage 37 from the atmosphere pressure Pa is larger than the predetermined second pressure P2. Accordingly, when fuel vapor recovered by the canister 3 is refluxed into the intake passage 5 connected to the engine, air can be introduced from the atmosphere in the canister 3 by using the check valve 42. Therefore, fuel vapor recovered by the canister 3 can be supplied to the intake passage 5 promptly.

Second Embodiment

A second embodiment of the present disclosure will be described referring to FIGS. 5 to 7B. In the second embodiment, an operating condition of a depressurizing pump 31 is partially different from an operating condition of the pressurizing pump 30 of the first embodiment. The depressurizing pump 31 may be used as the pump which pressurizes or depressurizes insides of the fuel tank 2 and the canister 3. The substantially same part with the first embodiment is assigned with the numeral of the same position, and the description of the part is omitted.

Figure 5:
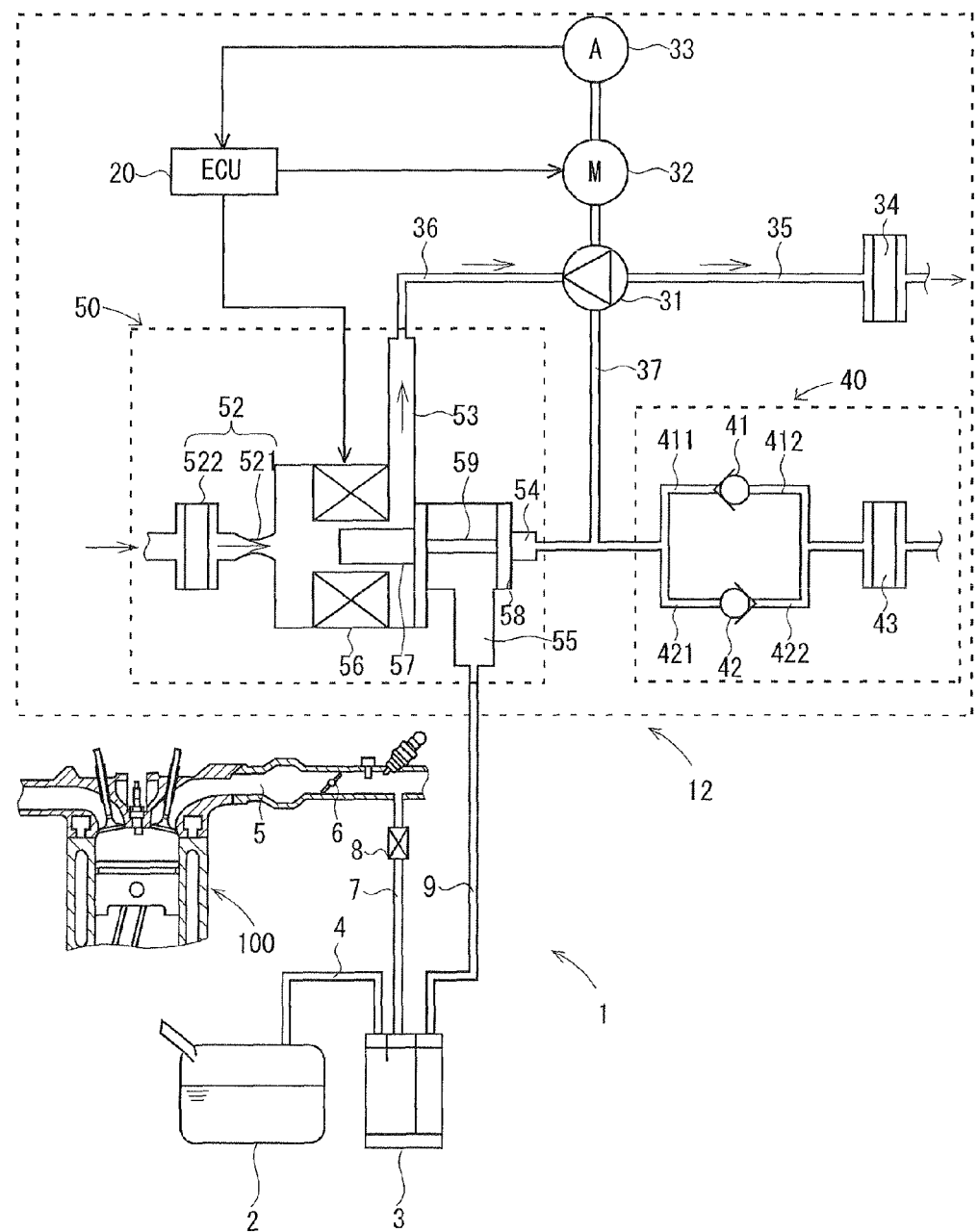
FIG. 5 is a schematic diagram showing a fuel vapor treatment system provided with a fuel vapor leak detection device according to a second embodiment of the present disclosure.
Figure 7A:
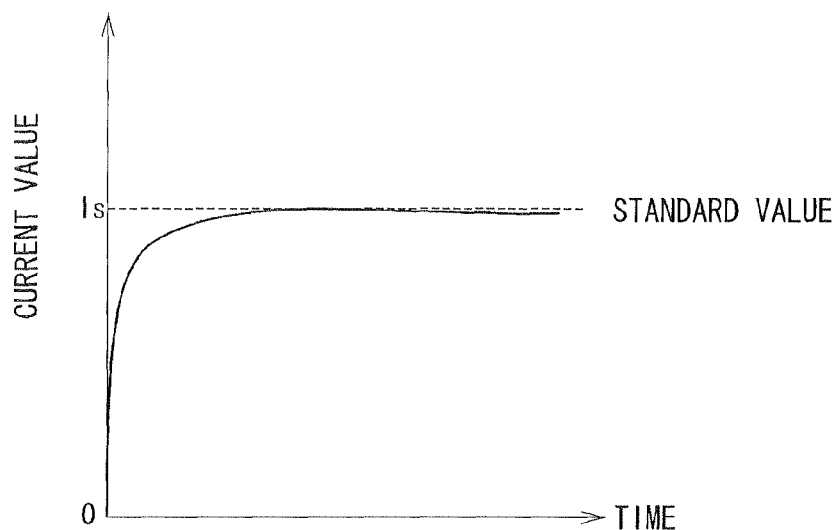
FIG. 7A is a time chart of a current value when measuring a standard value, in the fuel vapor leak detection device according to the second embodiment.

A fuel vapor leak detection device 12 of the second embodiment detects a leakage of fuel vapor by using the depressurizing pump 31. When an atmosphere pressure is detected at a first stage, as shown in FIG. 5, the depressurizing pump 31 draws air through the orifice 521. A current value of the motor 32 which drives the depressurizing pump 31 is detected by the ammeter 33. After the elapse of a certain period of time, a current value detected in the ammeter 33 becomes constant as shown in FIG. 7A, and the detected current value is referred to as a standard value Is. Arrows shown in FIG. 5 indicate an air flow in the first stage.

Figure 6:
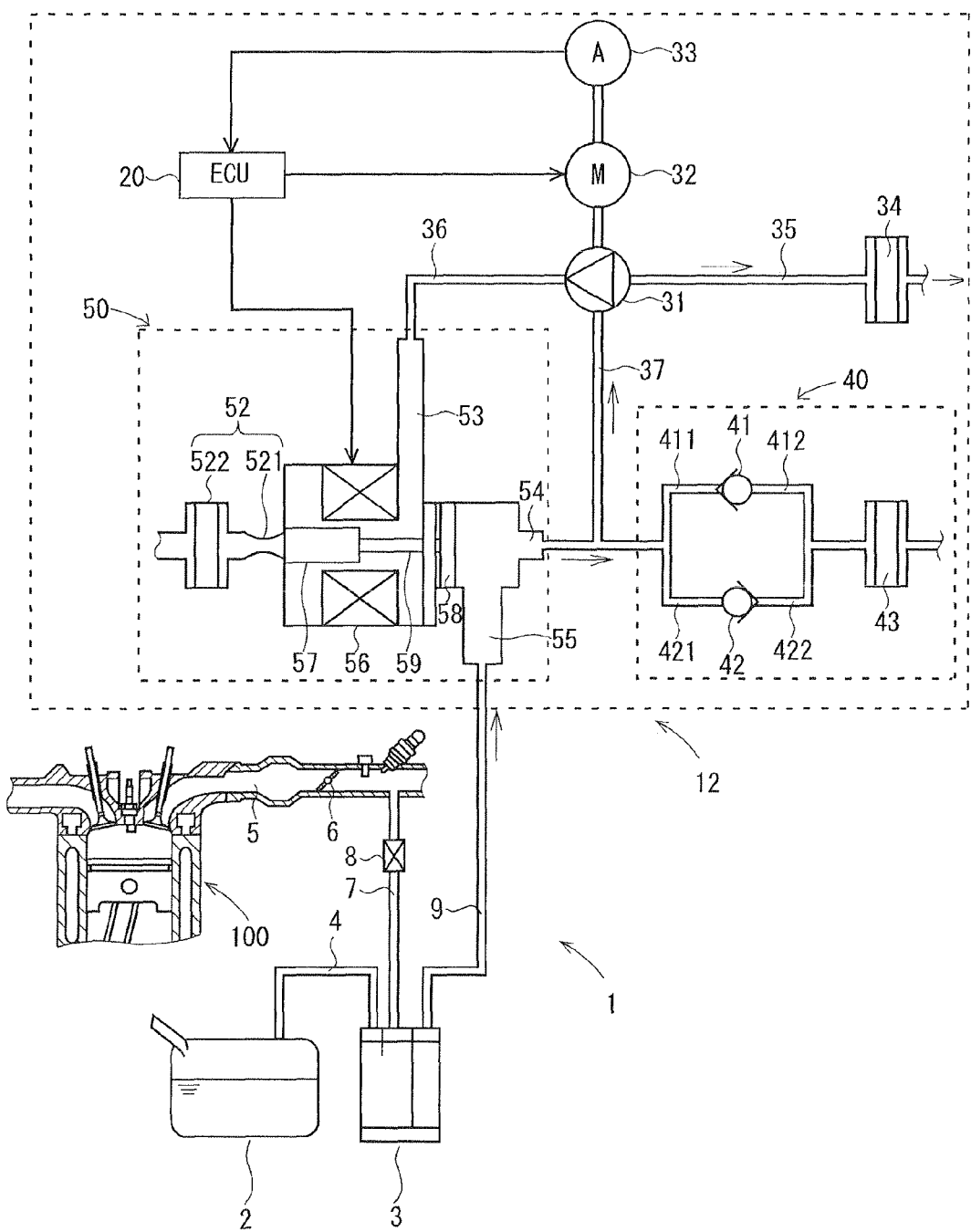
FIG. 6 is a schematic diagram showing the fuel vapor treatment system provided with the fuel vapor leak detection device according to the second embodiment in an operating condition different from FIG. 5.
Figure 7B:
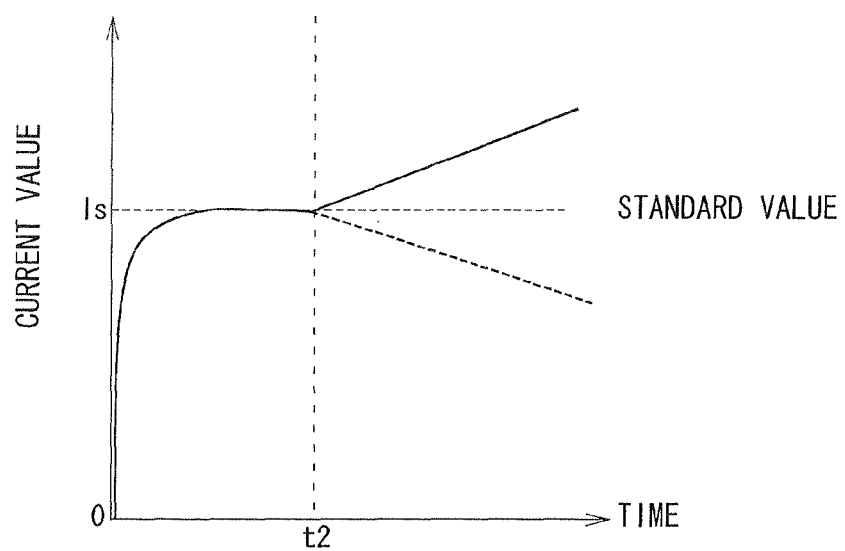
FIG. 7B is a time chart of a current value when detecting a leakage of fuel vapor, in the fuel vapor leak detection device according to the second embodiment.

Subsequently, a leakage of fuel vapor from the fuel tank 2 or the canister 3 is detected in a second stage. As shown in FIG. 6, the switching valve 50 switches from the first stage communicating between the air passage 52 and the first passage 53 to the second stage communicating between the second passage 54 and the canister connection passage 55. Arrows in FIG. 6 indicate an air flow in the second stage. Accordingly, the depressurizing pump 31 is connected to the fuel tank 2 and the canister 3. As shown in FIG. 7B, a current value detected in the ammeter 33 changes by the switching of the connections at time t2. When a current value detected by the ammeter 33 is larger than the standard value Is after time t2 elapses as shown by the solid line of FIG. 7B, it is determined that a leakage amount of air containing fuel vapor from the fuel tank 2 or the canister 3 is less than a permissible amount. On the other hand, when a current value detected by the ammeter 33 is smaller than the standard value Is as shown by the dashed line of FIG. 7B, it is determined that a leakage amount of air containing fuel vapor from the fuel tank 2 or the canister 3 is more than the permissible amount. At this time, a pressure P in the second pump passage 37 connected to the fuel tank 2 or the canister 3 is larger than a pressure derived by subtracting the second pressure P2 from the atmosphere pressure Pa, such that the check valve 42 does not open.

Third Embodiment

A third embodiment of the disclosure will be described referring to FIGS. 8 to 10B. In the third embodiment, a configuration for detecting an operating condition of the pressurizing pump 30 is different from a configuration for detecting the operating condition of the pressurizing pump 30 according to the first embodiment. The substantially same part with the first embodiment is assigned with the same numeral, and the description of the part is omitted.

Figure 8:
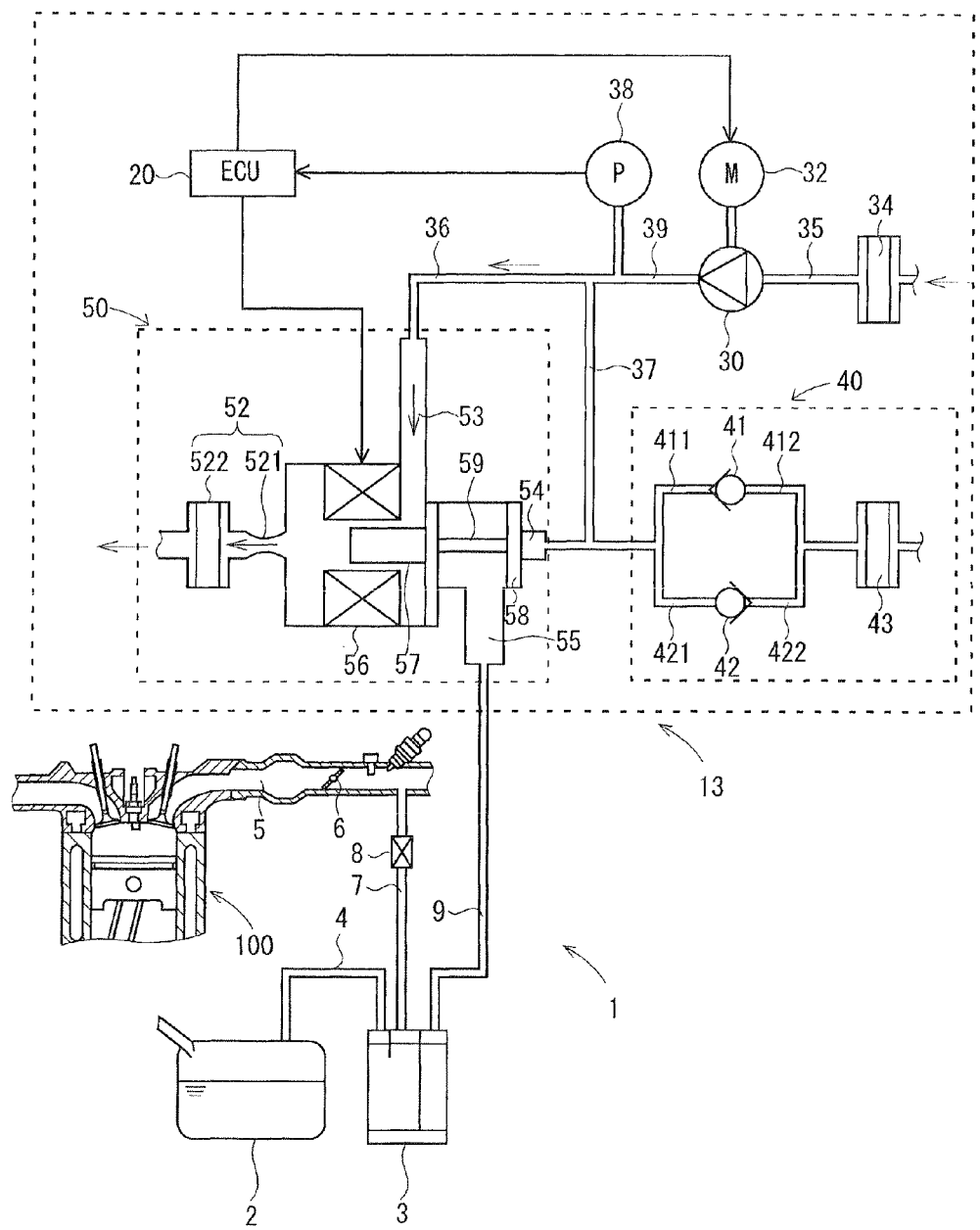
FIG. 8 is a schematic diagram showing a fuel vapor treatment system provided with a fuel vapor leak detection device according to a third embodiment of the present disclosure.
Figure 9:
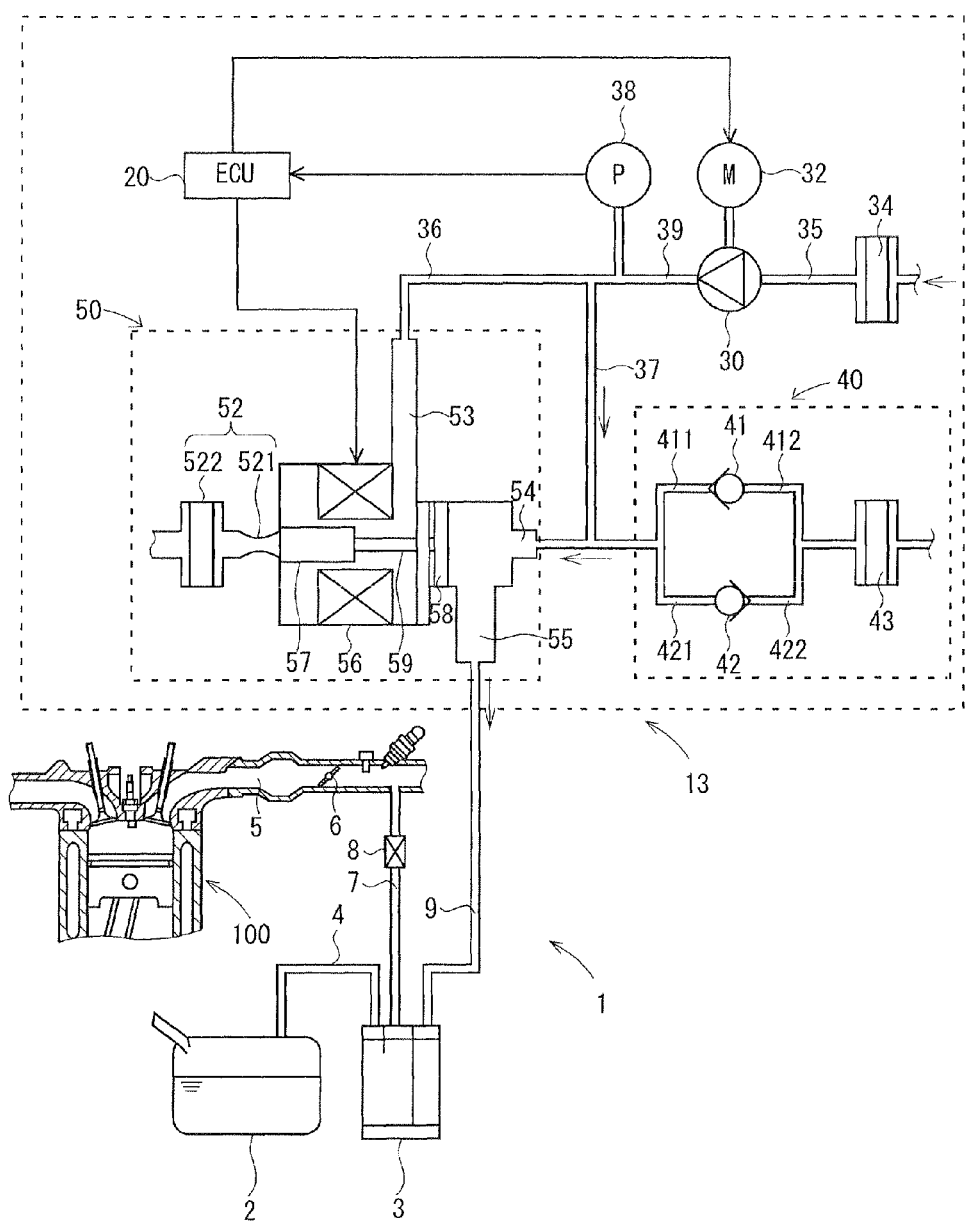
FIG. 9 is a schematic diagram showing the fuel vapor treatment system provided with the fuel vapor leak detection device according to the third embodiment in an operating condition different from FIG. 8.

A fuel vapor leak detection device 13 of the third embodiment detects an atmosphere pressure Pa and a leakage of fuel vapor from the fuel tank 2 and the canister 3 by utilizing a pressure meter 38 as an example of a pressure detector which detects a pressure in the first and second pump passage 36 and 37. As shown in FIGS. 8 and 9, the pressure meter 38 is located in a pump passage 39 thorough which the pressurizing pump 30 is connected to a junction of the first pump passage 36 and the second pump passage 37.

Figure 10A:
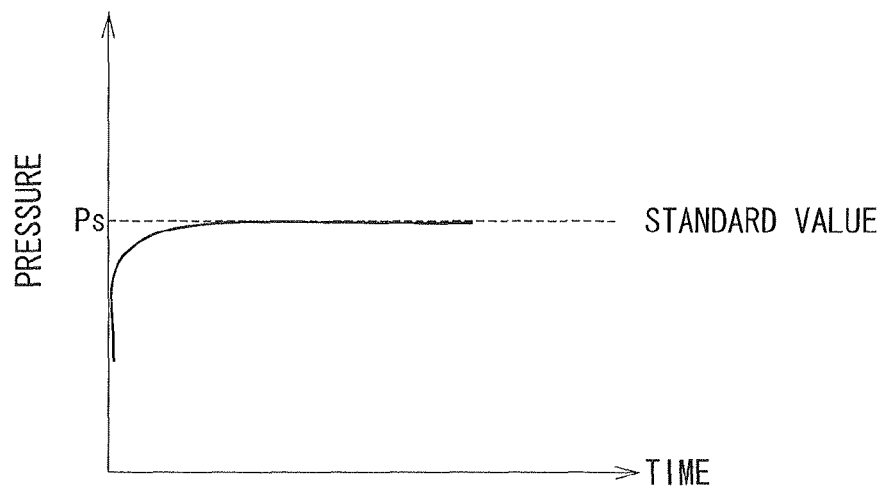
FIG. 10A is a time chart of a current value when measuring a standard value, in the fuel vapor leak detection device according to the third embodiment.

When the atmosphere pressure is detected at a first stage, in the third embodiment, the pressurizing pump 30 emits air to the atmosphere through the orifice 521 as shown in FIG. 8. At this time, the pressure meter 38 detects a pressure in the first passage 53. After the elapse of a certain period of time, a pressure detected in the pressure meter 38 becomes constant as shown in FIG. 10A. The detected pressure is referred to as a standard value Ps. Arrows shown in FIG. 8 indicate an air flow.

Figure 10B:
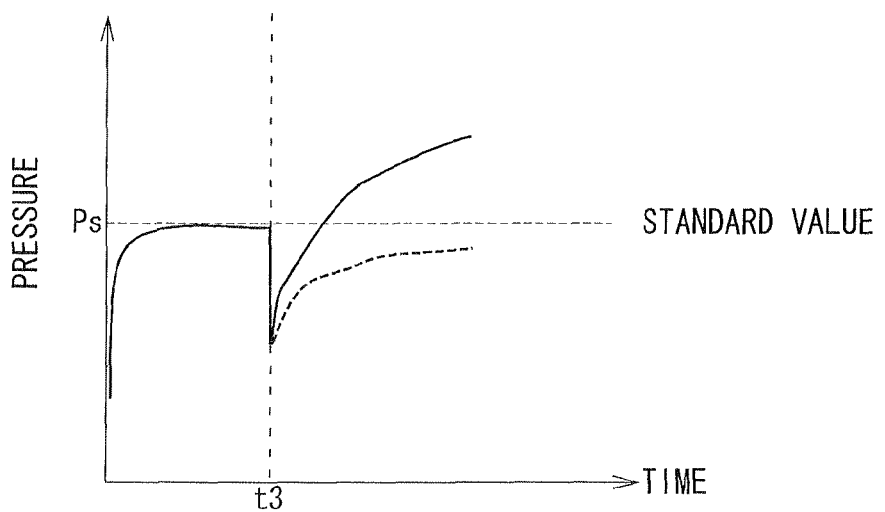
FIG. 10B is a time chart of a current value when detecting a leakage of fuel vapor, in the fuel vapor leak detection device according to the third embodiment.

Subsequently, a leakage of fuel vapor from the fuel tank 2 or the canister 3 is detected at a second stage shown in FIG. 9. As shown in FIG. 9, the switching valve 50 switches from the first stage communicating between the air passage 52 and the first passage 53 to the second stage communicating between the second passage 54 and the canister connection passage 55. Arrows shown in FIG. 9 indicate an air flow in the second stage. Accordingly, the pressurizing pump 30 is connected to the fuel tank 2 and the canister 3. At this time, the pressure meter 38 detects a pressure in the second passage 54 connected to the fuel tank 2 and the canister 3. As shown in FIG. 10B, the pressure value detected by the pressure meter 38 suddenly reduces by the switching of the connections at time t3. When a pressure detected by the pressure meter 38 becomes larger than the standard value Ps during a predetermined time period after time t3 elapses as shown by the solid line of FIG. 10B, it is determined that a leakage amount of air containing fuel vapor from the fuel tank 2 or the canister 3 is less than a permissible amount. On the other hand, when a pressure detected by the pressure meter 38 is smaller than the standard value Ps as shown by the dashed line of FIG. 10B, it is determined that a leakage amount of air containing fuel vapor from the fuel tank 2 or the canister 3 is more than the permissible amount.

A leakage of fuel vapor is detected by utilizing the pressure meter 38 in the third embodiment. Hence, accuracy of a detection of a fuel vapor leakage in the fuel tank 2 and the canister 3 is improved. Therefore, a fuel vapor leakage can be detected with a high degree of accuracy in addition to the effects (A), (B), (C), and (D) of the first embodiment.

Fourth Embodiment

A fourth embodiment of the present disclosure will be described referring to FIGS. 11 to 13B. In the fourth embodiment, an operating condition of the depressurizing pump 31 is partially different from the operating condition of the pressurizing pump 30 of the third embodiment. The substantially same part with the third embodiment is assigned with the numeral of the same position, and the description of the part is omitted.

Figure 11:
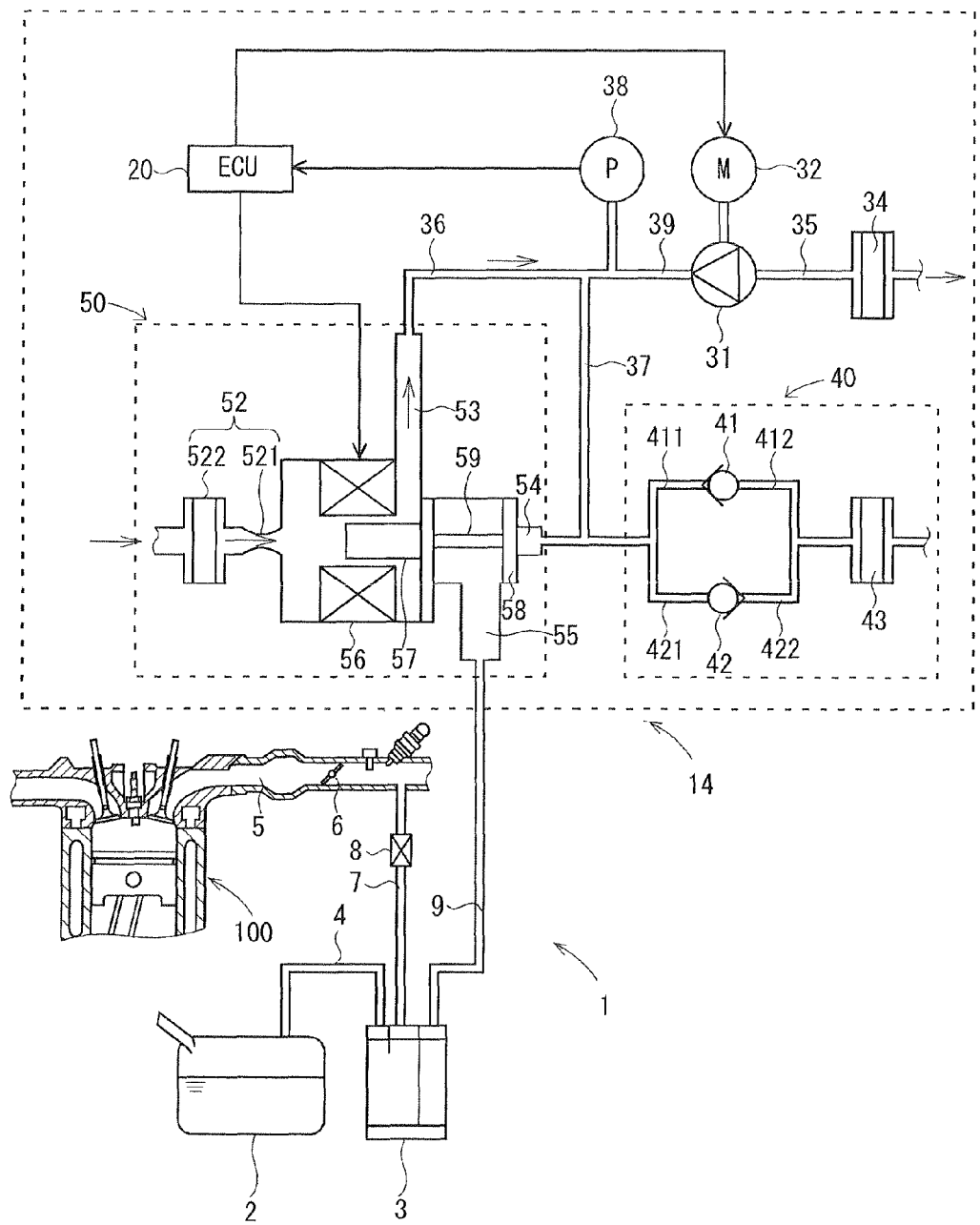
FIG. 11 is a schematic diagram showing a fuel vapor treatment system provided with a fuel vapor leak detection device according to a fourth embodiment of the present disclosure.
Figure 12:
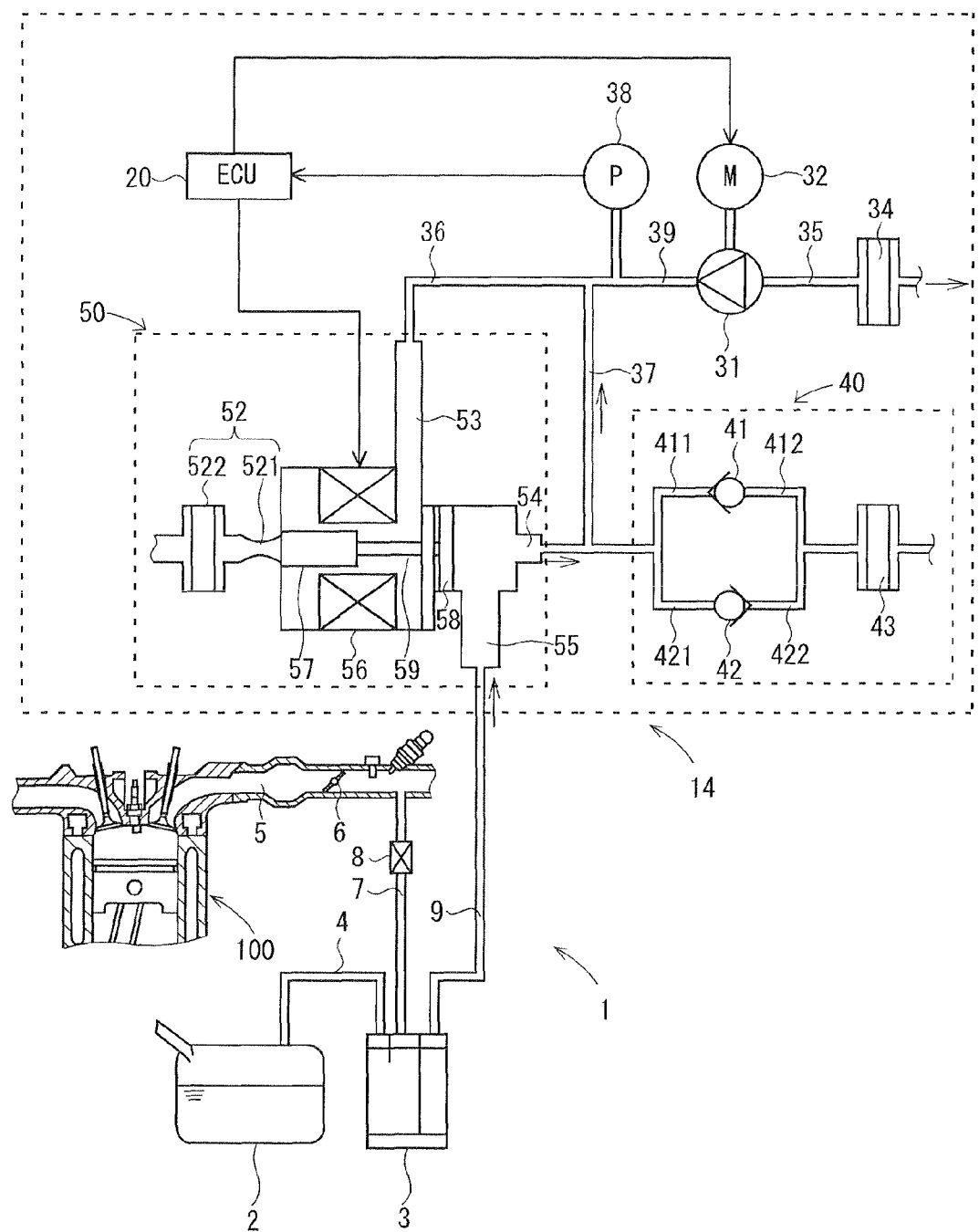
FIG. 12 is a schematic diagram showing the fuel vapor treatment system provided with the fuel vapor leak detection device according to the fourth embodiment in an operating condition different from FIG. 11.
Figure 13A:
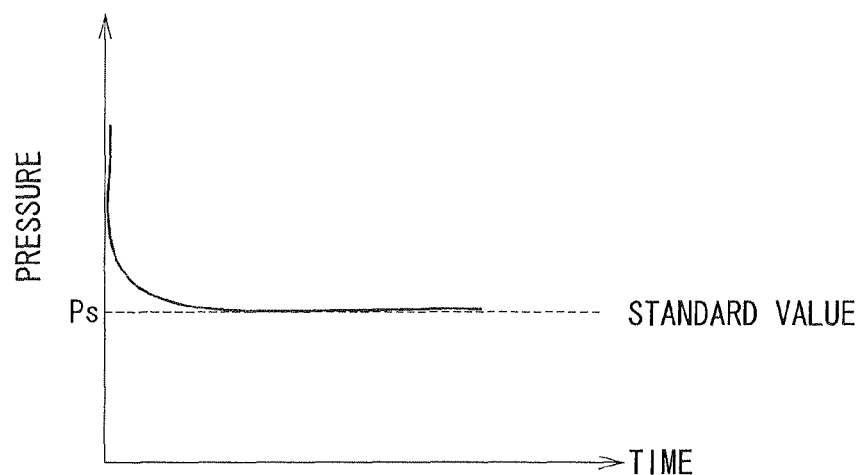
FIG. 13A is a time chart of a current value when measuring a standard value, in the fuel vapor leak detection device according to the fourth embodiment.

A fuel vapor leak detection device 14 of the fourth embodiment detects a leakage of fuel vapor by utilizing the depressurizing pump 31 described in the second embodiment. When an atmosphere pressure Pa is detected at a first stage, the depressurizing pump 31 draws air through the orifice 521 as shown in FIGS. 11 and 12. At this time, the pressure meter 38 detects a pressure in the first pump passage 36. After the elapse of a certain period of time, a pressure detected in the pressure meter 38 becomes constant as shown in FIG. 13A. The detected pressure is referred to as a standard value Ps. Arrows shown in FIG. 11 indicate an air flow.

Figure 13B:
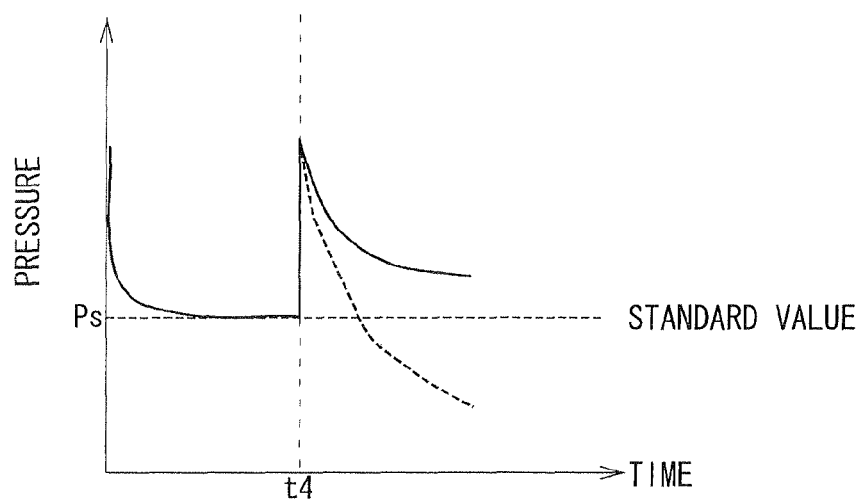
FIG. 13B is a time chart of a current value when detecting a leakage of fuel vapor, in the fuel vapor leak detection device according to the fourth embodiment.

Subsequently, a leakage of fuel vapor from the fuel tank 2 or the canister 3 is detected at a second stage. As shown in FIG. 12, the switching valve 50 switches from the first stage communicating between the air passage 52 and the first passage 53 to the second stage communicating between the second passage 54 and the canister connection passage 55. Arrows shown in FIG. 12 indicate an air flow at the second stage. Accordingly, the depressurizing pump 31 is connected to the fuel tank 2 and the canister 3. As shown in FIG. 13B, a pressure value detected in the pressure meter 38 suddenly includes by the switching of the connections at time t4. When a pressure detected by the pressure meter 38 becomes larger than the standard value Ps during a predetermined period after time t4 elapses as shown by the solid line of FIG. 13B, it is determined that a leakage amount of air containing fuel vapor from the fuel tank 2 or the canister 3 is less than a permissible amount. On the other hand, when a pressure detected by the pressure meter 38 is smaller than the standard value Ps as shown by the dashed line of FIG. 13B, it is determined that a leakage amount of air containing fuel vapor from the fuel tank 2 or the canister 3 is more than the permissible amount. At this time, a pressure in the second pump passage 37 connected to the fuel tank 2 or the canister 3 is larger than a pressure derived by subtracting the second pressure P2 from the atmosphere pressure Pa, such that the check valve 42 does not open.

Other Embodiments (i) In the above-described embodiments, the electromagnetically-driven four-way valve shown in FIG. 3 is used as the switching valve 50. However, the four-way valve used in the fuel vapor leak detection device of the present disclosure is not limited to the electromagnetically-driven type. A four-way valve may be used, which switches between a communication between the air passage 52 and the first passage 53 and a communication between the second passage 54 and the canister connection passage 55, not necessarily by an electromagnetically-drive force.

(ii) In the above-described third and fourth embodiments, a drive source of the pressurizing pump 30 or the depressurizing pump 31 as an example of the pump is the motor 32 driven electrically. However, the drive source of the pump is not limited to the electrically-driven source. As drive source of the pump, an engine may be used.

The present disclosure is not limited to the above embodiments and is available as various configurations without departing from the scope of the disclosure. For example, the fuel vapor leak detection device of the above embodiments may be described or modified as follows.

The fuel vapor leak detection device 11 and 12 according to the first or second embodiment detects a leakage of fuel vapor through the canister 3 which adsorbs fuel vapor generated in the fuel tank 2. The fuel vapor leak detection device 11 or 12 includes the pump 30 or 31 which pressurizes or depressurizes insides of the fuel tank 2 and the canister 3. The pump 30, 31 is driven by the motor 32, and a current value applied to the motor 32 is detected by the electrical current detector (33). The fuel vapor leak detection device 11, 12 includes the switching valve 50 which switches passage communications. The switching valve includes the air passage 52, the first passage 53, the canister connection passage 55, and the second passage 54. The air passage 52 has a narrowing part (521) therein and communicates with the atmosphere. The first and second passages 53 and 54 are connected to the pump 30 or 31 by separate roots, and the canister connection passage 55 connects to the canister 3. The switching valve 50 switches one of communication between the air passage 52 and the first passage 53 and communication between the canister connection passage 55 and the second passage 54 by a command of the controller (20). The controller (20) controls switching operation of the switching valve 50 based on the current value detected by the electrical current detector (33).

The switching valve 50 includes four passages as described above, and switches passage communications depending on stages of fuel vapor leak detection. In a first stage of the fuel vapor leak detection, that is a standard-value detection, the air passage 52 including the narrowing part (521) connects to the first passage 53, so that a pressure of air, which has passed through the narrowing part (521), is detected. The electrical current detector (33) detects a current value in the motor 32 which drives the pump, and the detected current value is used as a standard value. Then, the canister connection passage 55 connecting to the canister 3 is connected to the second passage 54 by the switching valve 50, so that the pump 30, 31 connects to the fuel tank 2 and the canister 3. The insides of the fuel tank 2 and the canister 3 are pressurized or depressurized by the pump 30 or 31. If there is a leak hole whose size is larger than an inner diameter of the narrowing part (521), a current value in the motor 32, which drives the pump 30, 31, becomes smaller than the standard value. Accordingly, a leakage of fuel vapor from the fuel tank 2 and the canister 3 is detected. In the fuel vapor leak detection devices 11 and 12, the fuel tank 2 and the canister 3 are isolated from the atmosphere while the air passage 52 communicates with the first passage 53. When a leakage of fuel vapor from the fuel tank 2 and the canister 3 is detected, the switching valve 50 switches passage communications. In this case, because the fuel tank 2 can be closed and a leakage of fuel vapor also can be detected by the simple structure, a volume of the fuel vapor leak detection device can be reduced. Moreover, the number of components can be decreased.

The fuel vapor leak detection devices 13 and 14 according to the third and fourth embodiments include the pressure detector (38) instead of the electrical current detector (33). The pressure detector (38) detects pressures in the first and second passages 53 and 54. The fuel vapor leak detection devices 13 and 14 detects a leakage of fuel vapor based on pressures detected in the first and second passages 53 and 54. The pressure in the first passage 53 is detected when the first passage 53 communicates with the air passage 52, namely, the detected pressure is a pressure of air flowing through the narrowing part (521). The pressure in the second passage 54 is detected when the canister connection passage 55 communicates with the second passage 54, namely, the detected pressure is a pressure in the fuel tank 2 and the canister 3. The fuel vapor leak detection device 13 and 14 detects a leakage of fuel vapor from the fuel tank 2 and the canister 3 based on a relationship between the pressures in the first and second passages 53 and 54. The pressure detector (38) generally has higher detection accuracy than the above-described electrical current detector (33) in accordance with a pressure change in the fuel tank 2 and the canister 3. Therefore, accuracy of fuel vapor leak detection can be improved by using the pressure detector (38) for detecting the pressures in the first and second passages 53 and 54.

The fuel vapor leak detection devices according to the above-described embodiments include the first and second check valves 41 and 42, one sides of which are connected to the second pump passage 37 connecting the second passage 54 to the pump 30 or 31. The other sides of the first and second check valves 41 and 42 communicate with the atmosphere. The first check valve 41 prevents a gas flow flowing from the atmosphere to the second pump passage 37. The first check valve 41 opens and causes the second pump passage 37 to communicate with the atmosphere when a pressure in the second pump passage 37 is larger than the first pressure P1. On the other hand, the second check valve 42 prevents a gas flow flowing from the second pump passage 37 to the atmosphere, contrary to the first check valve 41. The second check valve 42 opens and causes the second pump passage 37 to communicate with the atmosphere when a difference calculated by subtracting the pressure in the second pump passage 37 from an atmosphere pressure is larger than the second pressure P2.

When fuel feeds to a vehicle provided with the fuel vapor leak detection device, gas in the fuel tank 2 is required to be emitted. The canister connection passage 55 is connected to the second passage 54 by the switching valve 50, so that the fuel tank 2 communicates with the atmosphere via the first check valve 41. The first check valve 41 opens when the pressure in the second pump passage 37 is larger then the first pressure P1. Accordingly, because gas in the fuel tank 2 is emitted through the first check valve 41, fuel can be supplied to the fuel tank 2 promptly. Therefore, time for feeding fuel to the vehicle can be reduced. When fuel vapor recovered by the canister 2 is supplied to the intake passage 5 connecting to the internal combustion engine, gas introduced from the atmosphere flows into the canister 2. The canister connection passage 55 is connected to the second passage 54 by the switching valve 50, so that the canister 3 communicates with the atmosphere via the second check valve 42. The second check valve 42 opens when the difference calculated by subtracting the pressure in the second pump passage 37 from the atmosphere pressure is larger than the second pressure P2. Accordingly, by introducing gas from the atmosphere, fuel vapor recovered by the canister 3 can be promptly supplied to the intake passage 5.

The switching valve 50 includes the housing 61, 62 which is connected to the air passage 52, the first passage 53, the second passage 54, and the canister connection passage 55. The movable core 57, which can reciprocate in the axial direction of the housing 61 and 62 inside the housing 61 and 62, is accommodated in the bottomed cylindrical fixed core 51. A magnetic attraction force between the movable core 57 and the fixed core 51 is produced by energization of the coil 56. The air passage 52 is provided in the bottom part 511 of the fixed core 51, and the inside of the fixed core 51 communicates with the atmosphere. The cylindrical part 512 of the fixed core 51 defines the first communication passage 70 through which the inner wall surface 512a and the outer wall surface 512b communicate with each other. The coil support (65) supports the coil 56 located on the radially inner side of the housing 61, 62, and the radially-inner wall surface 65a of the coil support (65) and the outer wall surface 512b of the fixed core 51 define the second communication passage 71 therebetween. The first communication passage 70 communicates with the first passage 53 through the second communication passage 71. Hence, the inside of the fixed core 51 communicates with the first passage 53 via the first and second communication passages 70 and 71.

The switching valve 50 controls open/close of the two valve parts 63, 64 by an operation of the single movable core 57. The movable core 57 is separated from or contacts the first valve seat (524) which is provided in the air passage forming member (511, 523, 61) as a member of the first valve part 63. Accordingly, the first valve part 63 including the first valve body (523) and the first valve member (57) is open or closed, i.e., the air passage 52 communicates with or is separated from the inside of the fixed core 51. The first communication passage 70 is provided in the cylindrical part 512 of the fixed core 51, and the inner wall surface 512a communicates with the outer wall surface 512b of the cylindrical part 512 through the first communication passage 70. The second communication passage 71 which communicates with the first communication passage 70 is provided between the wall surface 65a of the coil support (65) and the outer wall surface 512b of the fixed core 51. The second communication passage 71 communicates with the first passage 53 provided in the housing 61. Thus, the air passage 52 can be connected to the first passage 53 via the inside of the fixed core 51. The second valve member (58) connected to the first valve member (57) via the connection member (59) is separated from or contacts the second valve seat (623), so that the second valve part 64 is open or closed, i.e., the second passage 54 communicates with or is separated from the canister connection passage 55. The movable core 57 is attracted to the fixed core 51 by energization of the coil 56. At this time, the movable core 57 used as the example of the first valve member contacts the first valve seat (524), and the air passage 52 is separated from the first passage 53. On the other hand, the second valve member (58) connected to the movable core 57 is separated from the second valve seat (623), and the canister connection passage 55 communicates with the second passage 54. Therefore, the fuel vapor leak detection device of the above embodiments can switch one of communication between the air passage 52 and the first passage 53 and communication between the second passage 54 and the canister connection passage 55, by the operation of the single valve member.

Additional advantages and modifications will readily occur to those skilled in the art. The disclosure in its broader terms is therefore not limited to the specific details, representative apparatus, and illustrative examples shown and described.

What is claimed is:

1. A fuel vapor leak detection device for detecting a leakage of fuel vapor by using a canister which adsorbs fuel vapor generated in a fuel tank, the fuel vapor leak detection device comprising:
a pump which pressurizes or depressurizes an inside of the fuel tank and an inside of the canister;
a motor which drives the pump;
an electrical current detector which detects a current value applied to the motor;
a switching valve that includes an air passage having a narrowing part and communicating with atmosphere, a first passage connected to the pump, a canister connection passage connected to the canister, and a second passage connected to the pump, wherein the switching valve switches a communication between the air passage and the first passage and a communication between the canister connection passage and the second passage; and a control device which controls the switching of the switching valve.

2. A fuel vapor leak detection device for detecting a leakage of fuel vapor by using a canister which adsorbs fuel vapor generated in a fuel tank, the fuel vapor leak detection device comprising:

a pump which pressurizes or depressurizes an inside of the fuel tank and an inside of the canister;

a switching valve that includes an air passage having a narrowing part and communicating with atmosphere, a first passage connected to the pump, a canister connection passage connected to the canister, and a second passage connected to the pump, wherein the switching valve switches a communication between the air passage and the first passage and a communication between the canister connection passage and the second passage; and a control device which controls the switching of the switching valve.

3. The fuel vapor leak detection device according to claim 1, further comprising:

a first check valve having one end connected to a pump passage connecting the pump and the second passage, and the other end communicating with the atmosphere, wherein the first check valve limits a flow of gas from the atmosphere to the pump passage; and a second check valve having one end connected to the pump passage, and the other end communicating with the atmosphere, wherein the second check valve limits a flow of gas from the pump passage to the atmosphere, wherein the first check valve opens and causes the pump passage to communicate with the atmosphere when a pressure in the pump passage is larger than or equal to a first pressure, and the second check valve opens and causes the pump passage to communicate with the atmosphere when a difference between the pressure in the pump passage and an atmosphere pressure is larger than or equal to a second pressure.

4. The fuel vapor leak detection device according to claim 1, wherein the switching valve further includes:

a housing including the air passage, the first passage, the canister connection passage, and the second passage;

a movable core reciprocatable in an axial direction of the housing;

a fixed core placed coaxially with the housing on an air passage side of the movable core, the fixed core having a bottomed cylindrical shape and including a bottom part which forms the air passage and a cylindrical part which has a first communication passage through which an inner wall surface and an outer wall surface of the cylindrical part communicate with each other, wherein the fixed core and the movable core produce magnetic attraction force therebetween by energization of a coil, a coil support supporting the coil on a radially inner side of the housing, wherein a radially-inner wall surface of the coil support and the outer wall surface of the cylindrical part of the fixed core forms therebetween a second communication passage connecting the first communication passage and the first passage;

a first valve body provided in an air passage forming member which forms the air passage, the first valve body including a first valve seat on an opposite side of the air passage forming member from the atmosphere;

a first valve member consisting of the movable core, wherein the air passage communicates with the first passage through the first communication passage and the second communication passage when the first valve member is separated from the first valve seat, and the air passage is isolated from the first passage when the first valve member contacts the first valve seat;

a second valve body provided in a second passage forming member which forms the second passage, the second valve body including a second valve seat on an opposite side of the second passage forming member from the pump;

a second valve member which connects or disconnects the second passage to or from the canister connection passage by contacting the second valve seat or being separated from the second valve seat; and a connection member connecting an opposite end part of the first valve member from the air passage and an opposite end part of the second valve member from the second passage, wherein the second valve member contacts the second valve seat when the first valve member is separated from the first valve seat, and the second valve member is separated from the second valve seat when the first valve member contacts the first valve seat.

* * * * *